United States Patent [19]

Dalton et al.

[11] Patent Number: 5,493,332
[45] Date of Patent: Feb. 20, 1996

[54] MODULAR ELECTRONIC IMAGING SYSTEM WHICH ACCEPTS REPLACEMENT SOLID STATE IMAGES

[75] Inventors: David C. Dalton, Tucson; Roger W. Cover, Oro Valley; Peide Jeng, Tucson, all of Ariz.

[73] Assignee: Photmetrics, Ltd., Tucson, Ariz.

[21] Appl. No.: 203,327

[22] Filed: Feb. 28, 1994

[51] Int. Cl.$^6$ .................................................. H04N 5/225
[52] U.S. Cl. ........................................ 348/207; 348/294
[58] Field of Search ................................... 348/294, 311, 348/312, 207, 72, 75; H04N 5/225

[56] References Cited

U.S. PATENT DOCUMENTS

4,539,586 9/1985 Danna et al. .............................. 348/75
4,907,089 3/1990 Yamaguchi et al. ..................... 348/312
4,926,258 5/1990 Sasaki et al. .............................. 348/72

Primary Examiner—Wendy R. Greening
Attorney, Agent, or Firm—Herbert M. Shapiro

[57] ABSTRACT

Solid state electronic cameras are made modular so that replacement of inoperative CCD imagers can be done quickly and inexpensively by storing in the camera heads the operating parameters of each of a variety of imagers such as charge coupled device imagers. A camera head with a replacement imager communicates to a resident controller the parameters of the replacement imager selected. Operating parameters such as clock pulse signals may, in addition, be varied as to pulse width and frequency. The parameters are stored in an address set in a look up table in association with imager identifications.

4 Claims, 6 Drawing Sheets

| STATE TABLE VALUES (PLCn) | PARALLEL VOLTAGES |
|---|---|
| 00 | P-Lo |
| 01 | P-Mid |
| 10 | P-Lo |
| 11 | P-Hi |

MODULAR ELECTRONIC IMAGING SYSTEM WHICH ACCEPTS REPLACEMENT SOLID STATE IMAGES

FIELD OF THE INVENTION

This invention relates to an electronic imaging system and more particularly to such a system which employs one of a set of solid state imaging arrays such as a charge coupled devices (CCDs).

BACKGROUND OF THE INVENTION

CCD cameras are commercially available and are in use for medical, scientific and industrial applications. Such a camera employs a camera head which houses the CCD in a hermetically sealed and cooled chamber. The camera body comprises an electronic controller which operates the CCD for capturing images electronically for storage or for video display or both.

On occasion, the CCD imagers become defective or in some way are unable to operate over the specified range of design parameters. In such cases, it is necessary to return the camera head and controller to the manufacturer to replace the CCD imager and to reprogram the controller to operate with the replacement CCD imager. The replacement operation not only is costly but also is time consuming and disruptive for the user.

BRIEF DESCRIPTION OF THE INVENTION

In accordance with the principles of the present invention, a CCD camera head and camera controller (camera body) are configured electronically to accept any one of a variety of CCD imagers from different suppliers and with different voltage, timing, gain, offset, etc. requirements in a manner to permit imager replacement without the necessity of returning the controller to the manufacturer.

To this end, the modular camera head includes an electrically erasable read-only memory (EEPROM) in which a plurality of look-up tables (LUT's) are defined. Codes representative of the operating parameters of a replacement CCD imager are stored in an LUT associated with the imager. Thus, a modular camera head, in accordance with the principles of the present invention, includes not only a CCD imager but a memory which has stored in it the operating parameters of a selected CCD imager from a significant variety of available CCD imagers. A central processing unit (CPU) in the camera head has stored in it, in the EEPROM, the parameters for each of a set of possible CCD's and reads the CCD identification information to select the corresponding data for later operation of the camera. Thus, a defective or inoperative CCD imager can be removed and replaced by another. In such a case, the replacement imager along with a memory having codes representative of the operating parameters of the replacement CCD :imager are communicated to the user's controller when the replacement head is installed.

The user's controller also includes electronics to interrogate the EAPROM in the modular camera head to down load the codes representing the operating parameters of the replacement CCD imager.

It is believed that a modular solid state imaging system configured electronically to permit replacement of the imager quickly and without return to the manufacturer of controller electronics represents a significant departure from prior art thinking.

The modular camera head also advantageously includes a static random access memory (RAM) into which the codes representing the replacement CCD imager operating parameters are stored for achieving relatively faster operation than could be achieved with a dynamic EAPROM. The controller operates to communicate the operating parameters to circuitry located in the controller and in the camera head.

DETAILED DESCRIPTION OF AN ILLUSTRATIVE EMBODIMENT OF THIS INVENTION

Generally speaking, the modular camera arrangement of the present invention comprises two units, the camera head and the Controller Electronics Unit (CEU). In the basic system, three embedded processors are always present. The processor in the camera head controls the setting and reading of various parameters associated with the CCD chip itself (e.g. CCD clock pulses, voltages and serial timing state tables.) The other two processors are in the CEU. One of them, the DSP, controls all timing for the CCD. The other processor controls all host communication, camera head communication, DSP communication and an assortment of background tasks (such as CCD temperature regulation.)

Figure 1:
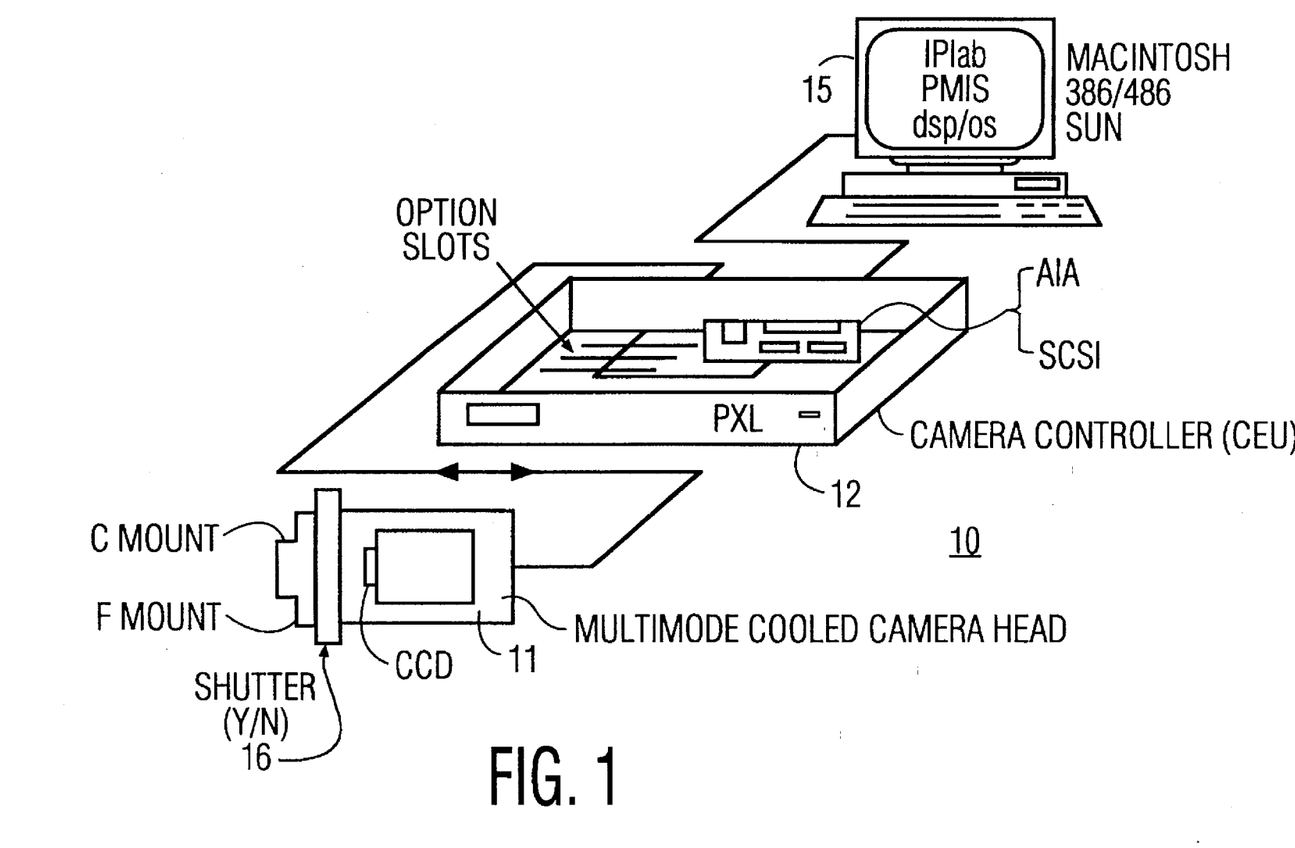
FIG. 1 is a schematic block diagram of a modular camera system in accordance with the principles of this invention.

FIG. 1 shows a modular camera system 10 in accordance with the principles of this invention. The system includes a camera head 11 and a controller 12 operating to capture images electronically in a manner consistent with well understood principles. The system is operated in response to user commands entered at the keyboard of a computer 15. Computer 15 may be any suitable personal computer such as a Macintosh, 386, 486, etc.

Figure 2:
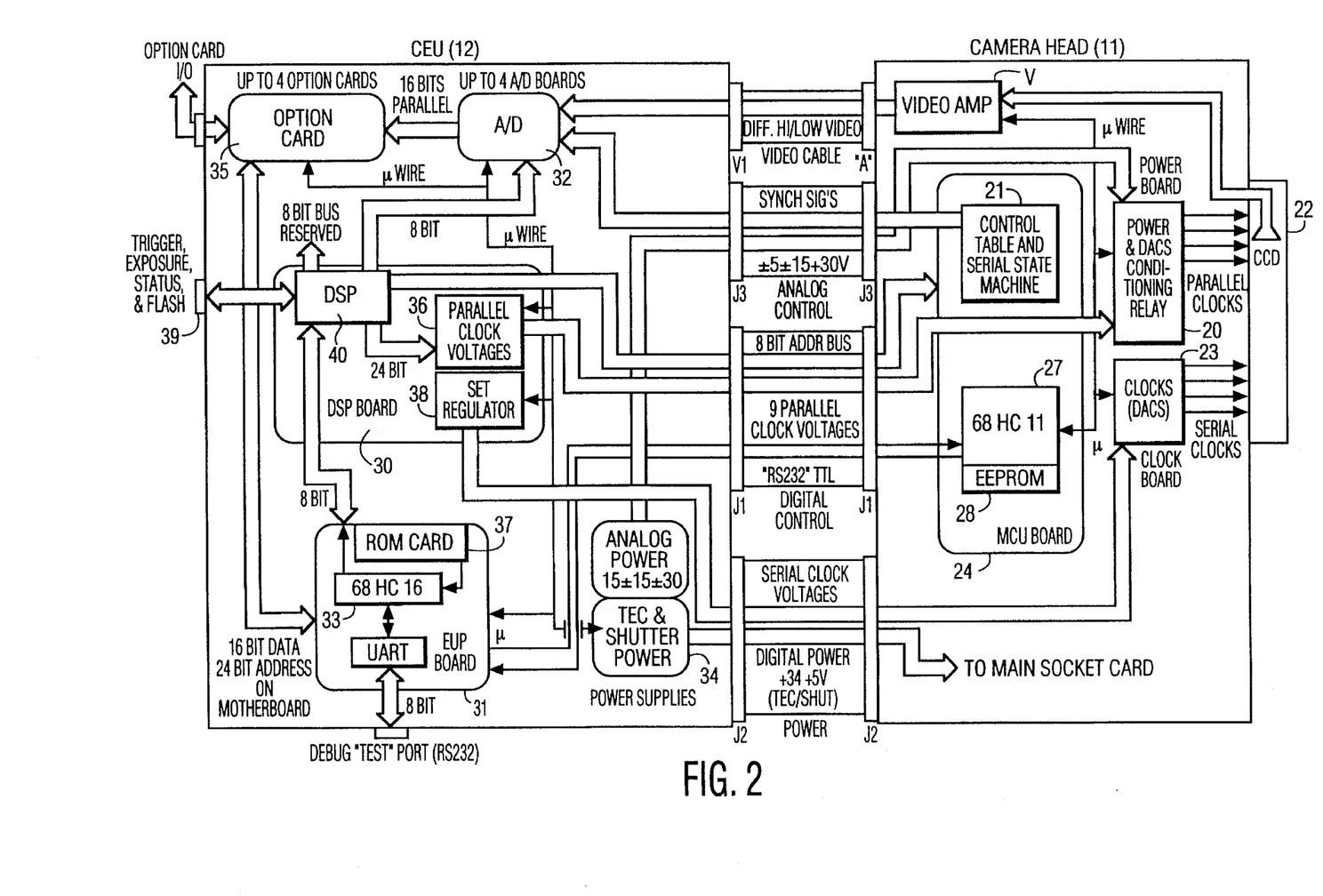
FIG. 2 is a detailed schematic block diagram of an illustrative modular camera of FIG. 1 in accordance with the principles of this invention.

FIG. 2 shows a functional block diagram of the electronic configuration of camera head 11 of FIG. 1. The cooled chamber housing a CCD imager and electrical pin out interface for the CCD arc disclosed in copending application Ser. No. 08/027,297 filed Mar. 4, 1993 by Derek Guenther and assigned to the assignee of the present application. FIG. 2 also shows the functional block diagram of the controller (CEU) 12 of FIG. 1. The controller is connected electronically to the head via cables and may be physically connected via a plug-in arrangement not shown.

The CCD socket arrangement is as described in the above-identified application of Guenther. The processor board on the other hand, is significantly different, generating digital signals in cooperation with a digital signal processor in the controller (CEU) of FIG. 2 as is described more fully hereinafter. Clock board 23 is responsive to the digital signals from the processor board to generate the analog voltage clock signals required for operation in response to directions from the digital signal processor 39 and MCU board 24.

The above-cited copending application to Derek Guenther discloses a modular solid state camera in which the profusion of electrical leads required for accommodating alternative solid state imagers are provided via a printed circuit board which also provides a hermetic seal to the cooled vacuum chamber which houses the imager (charge coupled device) in the camera head.

Figure 3A:
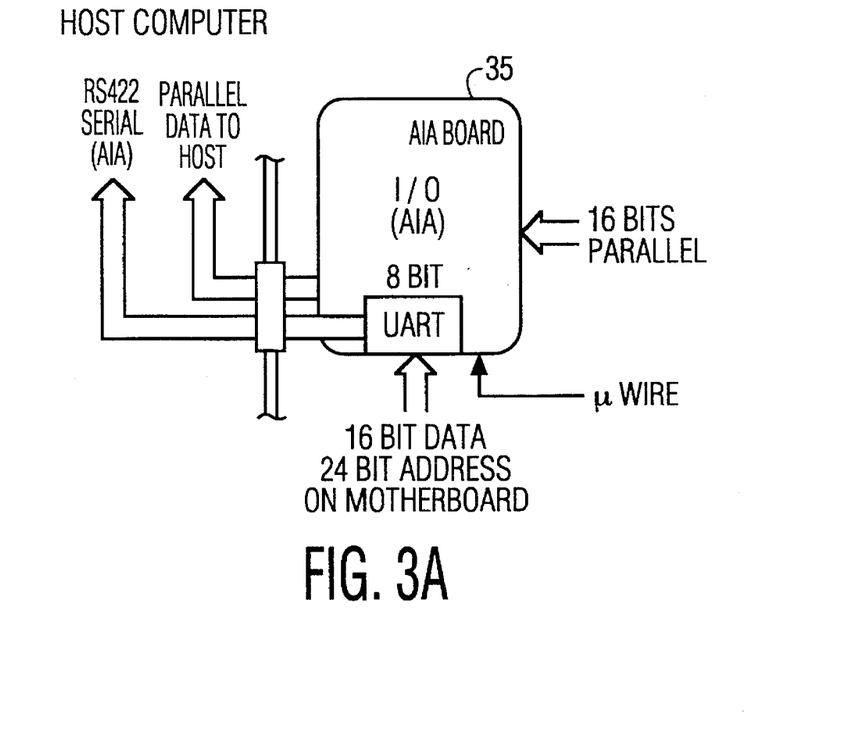
FIG. 3A and 3B are schematic block diagrams of illustrative option cards for a modular camera controller or camera body of FIG. 2.
Figure 3B:
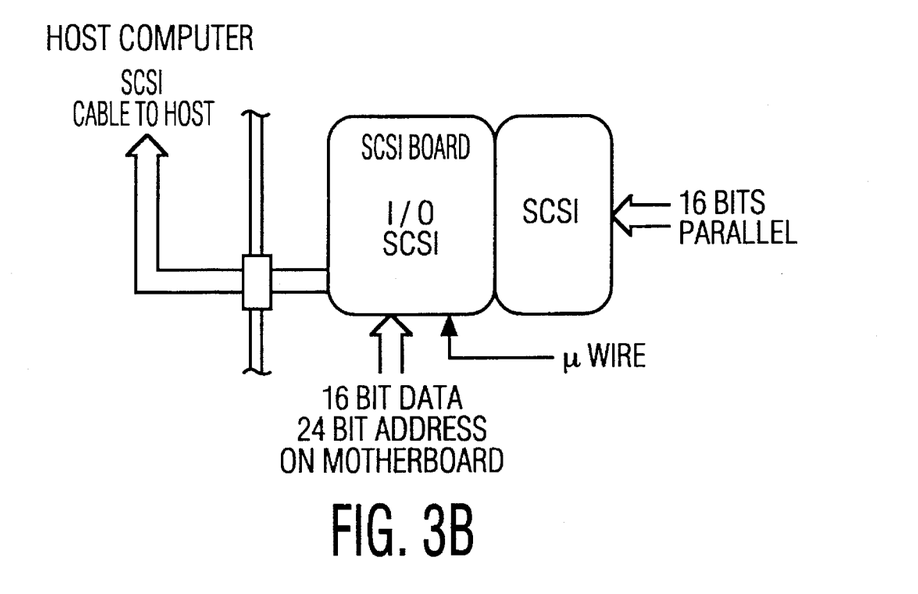

Option card module 35 serves two purposes. It provides host computer communications and (optionally) it provides signal process or external control. Option card module 35 in the illustrative embodiment can be plugged into one of the four plug-in slots. The host communication option is required for every system. The host communication option provides the interface to the selected host computer for camera commands and status, along with providing camera pixel data to the host computer. The other three slots are for optional hardware modules such as an image buffer, a flat field correction system, look up tables and a pixel stream recombiner. FIGS. 3A and 3B illustrate two optional cards for use in the arrangement illustrated in FIG. 2.

A/D board 32 converts the serial pixel stream into a parallel digital pixel stream.

Digital signal processor (DSP) board 30 provides accurate timing for the CCD. Control and setup information is communicated to this module through the 68HC16 processor, processor 33, in EUP board 31. DSP board 30's interrupt is through external trigger port 39 which is used to control exposures. The DSP board generates parallel clock voltages for the system and the serial preregulator board 38, a clock board 23, a backplate and shutter control board 34 and a CCD socket array 22 as disclosed in the above-mentioned copending application of Guenther.

All external communication to CEU 12 is controlled by processor 33. Host computer communication comes through the host communication option module which is option card module 35. Processor 33 then preprocesses host commands from option card 35 and passes them on to the various other modules. Additionally, this processor is responsible for background tasks such as temperature regulation.

TEC and shutter power module 34 is a programmable voltage power supply which provides power to the thermoelectric cooler attached to the CCD and shutter drive current. Adjusting power to the TEC adjusts the temperature of the CCD. This regulator is part of the temperature regulation servo loop controlled by processor 33.

With reference to camera head 11, video amplifier module 20 provides analog signal processing of the CCD's analog video output. Module 20 has programmable gain, offset and video signal simulation for test purposes. The programmable gain and offset are used to match the CCD;s video output to the input requirements of A/D board 32.

Control table and serial state machine module 21 generates the various control signals to run the CCD along with the fast serial clocking signals. These tables are loaded by processor 27 (also shown as 68HC11 on FIG. 2). The contents of parallel clock voltages module 36 in CEU 12 drive the CCD in the camera head. Control address table module ( not shown) in DSP module 30 of CEU 12 drives the control table and subsequently serial state machine module 21.

Power and DACS conditioning relay module 20 provides all voltages required by the CCD. These voltages are programmable by processor 27. The voltages generated on this board are used for statically biasing CCD 22 and also as input to the clocks module 23 for generation of CCD clocks.

Clock module 23 using power from serial preregulator module 38 and timing signals from control table and serial state machine module 21 (specifically the serial state machine signals) generate the serial clocks at the proper voltage levels for the CCD.

Processor 27 provides communication with CEU 12, accepting commands for setting and reading of CCD voltages within power and DACS conditioning relay module 20, signal delay settings, control table values within control table and serial state machine module 21 and video channel parameters within video amplifier V. Processor 27 also provides read back of the CCD temperature as part of the temperature control servo loop.

On power up, processor 33 tests microwire and parallel voltage module 36. Subsequently, camera head 11 is taken out of reset, which causes it to go through its power up sequence. After camera head 11 has completed its power up sequence, processor 33 then performs system-wide tests involving various functions such as DSP-to-control table addressing. Next, processor 33 downloads all of the characterization parameters from EEPROM 28 in camera head 11. The processor then examines the installed A/D cards and option cards. Each of these cards has a unique identification number that is readable by the processor. This card type ID code is matched against the requirements of the attached head and builds the Speed Table from information obtained from the "Speed Files" (also stored in EEPROM). The speed table contains all necessary information for making the found camera configuration function properly at all valid speeds. The various characterization parameters are now set in their respective modules in preparation for initiating an operational state. At this point, if all tests have been successfully completed, the voltages to the CCD 22 are turned on. One final operational test is run on the clocking voltages module 23 and, if these tests are successful, the background tasks and command loop are started. The camera is now operational. It is through this startup process of reading configuration information from the camera head and the A/D cards and configuring an operational system from this information that permits interchangability of modules.

Among the characterization parameters for the individual CCD's are:

| | |
|---|---|
| CCD ID code | This is the unique identifier which must match the machine-readable code read from the CCD socket card. |
| Capability Flags | These specify various operating modes for the CCD, e.g., MPP, frame characteristics |
| Temperature Range | These specify the operating temperature range for the CCD. |
| Prescan | These specify the number of preconversion pixels |
| Well Capacity | These specify the summing well, parallel and serial register well capacities in electrons. |
| Shutter Delays | These specify the shutter open and close intervals. |
| Serial Number | This specifies the serial number for the CCD. |
| Parallel Delay | These specify the time required for a single parallel shift for the camera head. |
| CCD Voltages | These specify<br>    Parallel Clock Voltage High Level |

|  |  |
|---|---|
|  | Parallel Clock Voltage Intermediate Level |
|  | Parallel Clock Voltage Low Level |
|  | Transfer Gate Voltage High Level |
|  | Transfer Gate Voltage Low Level |
|  | Serial Clock Voltage High Level |
|  | Serial Clock Voltage Low Level |
|  | Summing Well Voltage High Level |
|  | Summing Well Voltage Low Level |
|  | Reset Voltage High Level |
|  | Reset Voltage Low Level |
|  | Output Gate Voltages |
|  | Output Drain Voltages |
| CCD Timing | These specify |
|  | Serial State Table |
|  | Serial Phases |
|  | State Control Table |
|  | CCD Configuration Word |
|  | Parallel Shift Tables |
|  | Serial Discard Tables. |

Among typical Speed File parameters are:

| | |
|---|---|
| ADC ID Code | This is a code identifying the type or types of ADC boards that this speed selection will operate properly with. |
| Bit Depth | These are the number of bits/pixel that can be reliably digitized. |
| Time/Pixel | This is the fastest digitization rate for this speed selection. |
| DSP Microcode ID | This is the name of the appropriate rate for this speed selection. |
| Wait States | This is the number of wait states to run the microcode. |
| Video Board Gain | This is the gain for a particular camera head's video amplifier. |
| Serial Clock Delay |  |
| Sync Pulse Width |  |
| Clamp Offset |  |
| Reset Pulse Width |  |
| ADC Fine Grain |  |
| ADC Coarse Grain |  |
| ADC Offset |  |
| ADC Channel Select |  |
| Synchronization Delay |  |
| Serial Tables | These are parameters which must be loaded appropriately because they change with speed. |

As stated, when a camera is installed or connected to the electronic control unit of a modular camera system, the head has stored within it the operating parameters of the charge coupled device (CCD) imager. That is to say, the central processing unit of the camera head has stored within it the voltage levels, temperatures, clock pulse patterns, etc., necessary for operation of the selected CCD.

The various parameters are stored in the LUT as a sequence of codes in addresses selected by an address generator under the control of the CPU in the CEU. Since temperatures vary and since voltages and clock pulse patterns are often required to change during operation of the camera, it is important to provide a control for varying those parameters within limits specified by the CCD manufacturer. The present invention is directed at an arrangement not only for allowing camera head replacement in a modular solid state camera but for permitting dynamic adjustment of operating parameters for the imager once installed.

One example of such an arrangement is a circuit for adjusting the clock pulse pattern for the operation of a CCD imager. The clock pulse pattern for a CCD is unique for each model of CCD. Therefore, each newly installed CCD has its associated clock pulse pattern stored as a sequence of codes in a series of addresses starting at a "start address" in the LUT. Presently available modular cameras from the assignee of the present invention permit the clock pulse pattern to be stored in four, six or eight addresses in the LUT.

Figure 4:
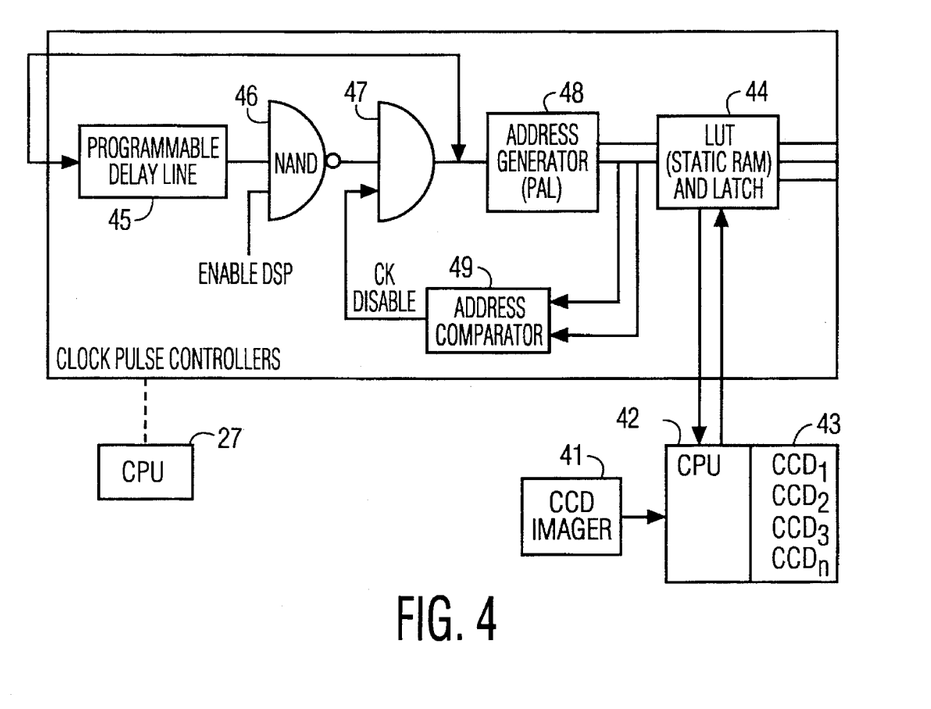
FIG. 4 is a block diagram of an illustrative clock pulse controller in accordance with the principles of the present invention.
Figure 5:
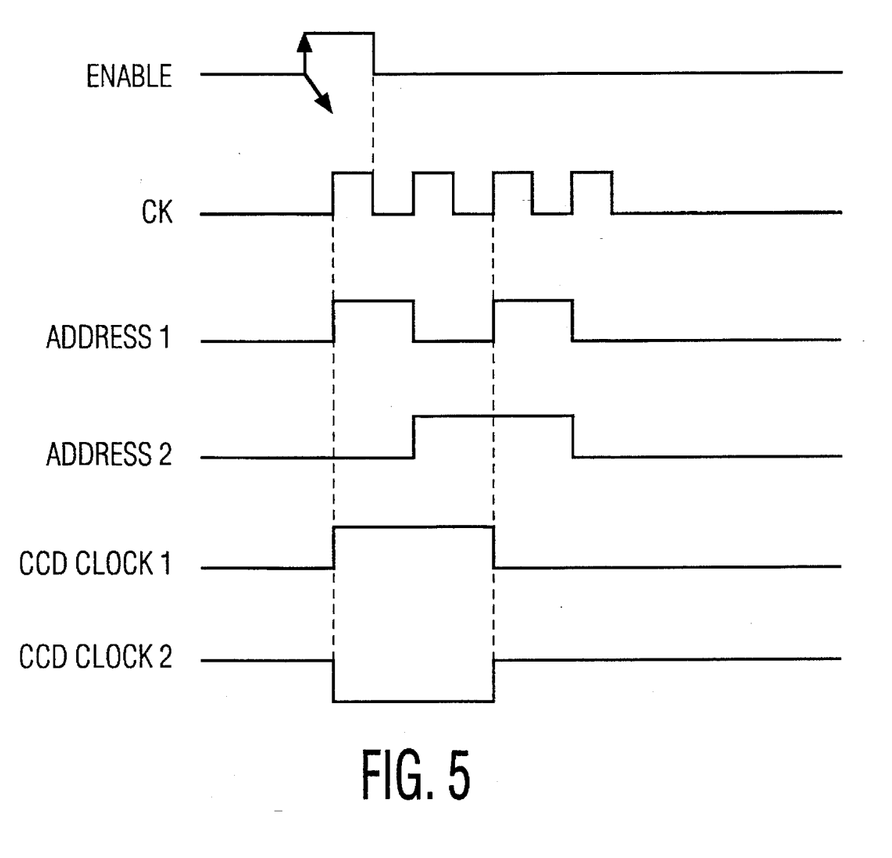
FIG. 5 illustrates typical waveforms and a truth table for the clock pulse controller of FIG. 4.

FIG. 4 shows a block diagram of the clock pulse control subsystem for providing an appropriate clock pulse sequence for a selected CCD and for varying the clock pulse pattern during operation. FIG. 5 shows the pulse diagram and truth table for the subsystem of FIG. 4.

Referring to FIG. 4, CPU 27 in the camera head stores (among other parameters), the clock pulse parameters unique to the CCD imagers which may be installed in the camera head. The clock pulse parameters are encoded by the camera manufacturer according to the CCD manufacturer's specification and are stored in the EEPROM LUT (28) of CPU 27. The clock pulse parameters for n CCD imagers are shown for illustrative purposes as $CCD_1$, $CCD_2$, ... $CCD_n$ in EEPROM LUT. As CCD imager 41 is inserted into the camera head, CPU 27 transfers the appropriate clock pulse parameters to LUT (static RAM and Latch) 44.

FIG. 5 shows two illustrative CCD clock patterns for two different addresses. The table shown on FIG. 5 shows the relationship between the addresses and the clock pattern. The representative clock patterns CCD #1 and CCD #2 are shown in the pulse diagram as 0110 and 1001, respectively.

The LUT (Static RAM and Latch) 44 responds to the address signal to output the designated signal as shown in the table in the pulse diagram. Thus, for four addresses: 00, 01, 02 and 03, the LUT outputs for CCD #1 are 0, 1, 1, 0 and for CCD #2 are 1, 0, 0, 1 as shown.

The feedback path from the output of AND circuit 47 to the input of delay line 45 ensures that when the CK pulse is high, the next CK signal will be low and vice versa. Thus, the output of the delay line is a sequence of pulses CK as shown in the pulse diagram.

The programmable delay line 45 is programmed to vary the pulse width of CK and thus control the frequency at the address generator. The CCD pattern width is also changed through the frequency change of the address generator. The pulse diagram shows the pulse forms for address #1 and address #2 and the resulting CCD clocks #1 and #2.

As shown in the pulse diagram, the rising edge of an enable pulse triggers a CK pulse after a delay determined by the programmable delay line 45. The CK pulse appears on the output of delay line 45 and the output of NAND (inverter) circuit 46. The CK pulse causes address generator 48 to generate an address (00) which is applied to LUT 44. LUT 44 outputs the clock pulse control signals in response to the occurrence and timing of an output signal from address generator 48. A next CK pulse causes address generator 48 to generate a second address (01) at a time determined by programmable delay line 45. For CCD #1, a binary 1 at address 01 (now selected) corresponds to the :initiation of a clock pulse. A third address (02), so generated, also stores a binary 1. Thus, a selected clock pulse continues for a duration determined by the programmable delay line.

The output from address generator 48 is applied to address comparator 49. When the addresses applied to address comparator 48 are the same the output signal from address comparator 49 disables the CK clock pulse signal.

Figure 6A:
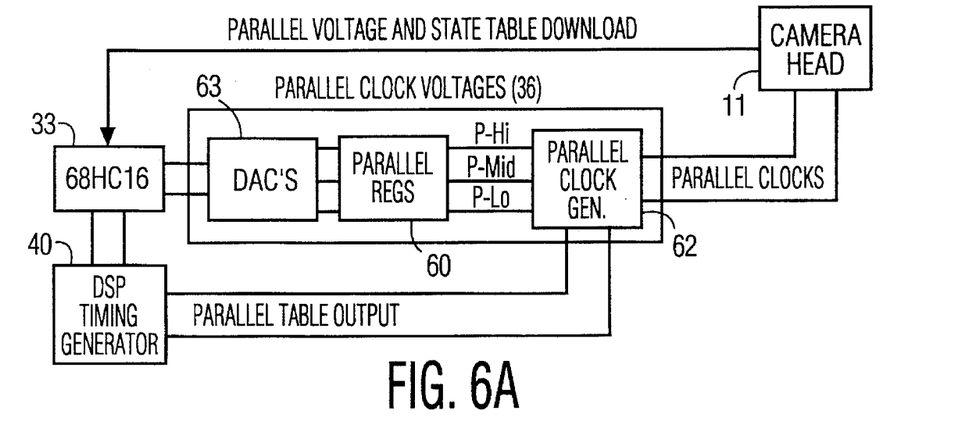
FIGS. 6A–6C are an illustrative parallel clock generator, a truth table and waveforms for the clock generator respect in accordance with the principles of the present invention.
Figure 6B:
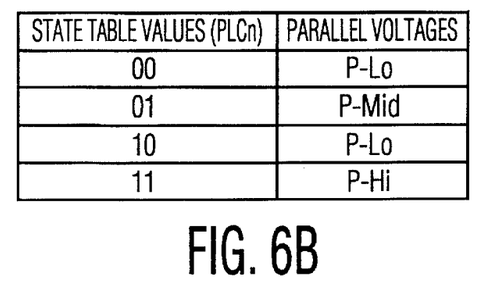
Figure 6C:
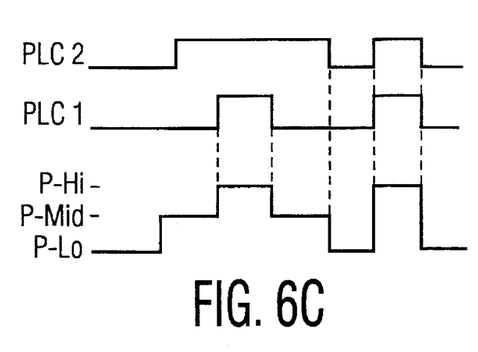

The manner in which the arrangements of the present invention permit replacement of one imager with another while maintaining the integrity of the clock pulse controller by means of stored operating parameters was discussed in combination with FIGS. 4 and 5. FIG. 6A illustrates in block diagram form the manner in which system integrity is maintained by means of programmable operating parameters for the parallel clocks when one imager is substituted for another. The parallel clocks require both voltage level and timing information. In addition, in the illustrative embodiment, the parallel clocks operate at a maximum of three discrete voltage levels (parallel high, parallel intermediate and parallel low). Referring to FIG. 6B and 6C (together with FIG. 2), these voltage levels are generated in controller 2 under control of processor 33. In particular, the voltage levels are controlled by series-pass analog regulators 60 adjusted with a digital to analog converter 63. The digital to analog converters are controlled directly by processor 33.

The parallel voltages are switched between high/intermediate/low values with timing signals generated by DSP timing generator 39. Timing of these clocks is controlled by parallel state tables, located within the DSP. Each Parallel State Table consists of sixteen 16-bit words these sixteen table entries are sequenced to generate a 16-step parallel clock cycle By changing the contents of these tables and the rate at which they are presented, the parallel clock timing is changed.

The Parallel Clock Generator is capable of producing up to eight clocks. Each clock can be programmed to switch between the three programmable clock voltage levels generated by the parallel regulators. The 16-bit output from the Parallel State Table is divided into eight 2-bit fields used to control each of the eight parallel clocks. The Parallel Clock Generator (62) is a set of eight three-to-one analog multiplexers whose outputs are connected to the parallel clock lines going to the camera head. Each multiplexer uses one of the 2-bit fields from the Parallel Table to switch between the three parallel voltages (generated by the parallel regulators.) The output of the multiplexers appears on the parallel clock lines going to the camera head.

As in the clock pulse controller and the other Functional elements for which the operating or characterizing parameters must be tailored to the CCD, the required voltage and timing parameters for the parallel clocks is stored in EEPROM 28 in camera head 11. Parameters from EEPROM 28 are used by processor 33 to program the DACs module 63 to control the parallel voltages. CEU 12 reads the parallel state table values from EEPROM 28 and loads these values into parallel state tables in DSP 30. CEU 12 is now configured to provide the required parallel timing at the appropriate clock voltage levels for the imager in use.

What is claimed is:

1. A solid state imaging camera system including a camera head, said head being configured to accept any one of electronically a variety of different solid state imagers, said head including a plurality of look up tables, one for each one of said variety of imagers, means for storing in associated ones of said look up tables codes representing the operating parameters of different ones of said variety of different imagers, and means for communicating to an electronically coupled controller the codes stored in the associated look up table for the selected one of said variety of imagers.

2. A solid state imaging camera system as set forth in claim 1 including a camera body wherein said camera body includes said controller, said controller including storage means and means for interrogating said camera head for transferring to said storage means in said controller from said associated look up table the codes representing the operating parameters of said selected imager.

3. A solid state imaging camera system as set forth in claim 2 wherein said associated look up table in said camera head includes a static random access memory, said controller including means for transferring from said random access memory from the associated look up table therein the codes representing the operating parameters of said selected imager.

4. A solid state imaging camera system as set forth in claim 1 wherein said solid state imagers comprise charge coupled devices.

* * * * *